US008381058B2

(12) United States Patent
Omeni

(10) Patent No.: US 8,381,058 B2
(45) Date of Patent: Feb. 19, 2013

(54) WIRELESS TRANSMISSION METHOD AND APPARATUS

(75) Inventor: Okundu Omeni, Oxfordshire (GB)

(73) Assignee: Toumaz Technology Limited, Oxfordshire (GB)

(*) Notice: Subject to any disclaimer, the term of this patent is extended or adjusted under 35 U.S.C. 154(b) by 313 days.

(21) Appl. No.: 12/681,128

(22) PCT Filed: Jul. 28, 2008

(86) PCT No.: PCT/GB2008/050628
§ 371 (c)(1), (2), (4) Date: Apr. 1, 2010

(87) PCT Pub. No.: WO2009/044181
PCT Pub. Date: Apr. 9, 2009

(65) Prior Publication Data
US 2010/0229064 A1   Sep. 9, 2010

(30) Foreign Application Priority Data
Oct. 4, 2007 (GB) .................................. 0719318.8

(51) Int. Cl.
*H04L 1/18* (2006.01)
(52) U.S. Cl. ......... 714/748; 370/330; 370/315; 370/328
(58) Field of Classification Search .................. 714/748; 370/315, 328
See application file for complete search history.

(56) References Cited

U.S. PATENT DOCUMENTS

| | | | |
|---|---|---|---|
| 6,076,181 A | 6/2000 | Cheng | |
| 6,581,176 B1 * | 6/2003 | Seo | 714/749 |
| 6,697,983 B1 * | 2/2004 | Chintada et al. | 714/748 |
| 7,333,440 B2 * | 2/2008 | Abrol et al. | 370/252 |
| 7,386,002 B2 * | 6/2008 | Meier | 370/449 |
| 7,395,481 B2 * | 7/2008 | Chintada et al. | 714/749 |
| 2005/0008038 A1 | 1/2005 | Peeters et al. | |
| 2005/0117521 A1 | 6/2005 | Abrol et al. | |
| 2005/0152350 A1 * | 7/2005 | Sung et al. | 370/376 |
| 2005/0281243 A1 | 12/2005 | Horn et al. | |
| 2007/0106997 A1 | 5/2007 | Lin et al. | |
| 2008/0123583 A1 * | 5/2008 | Shiizaki et al. | 370/315 |

FOREIGN PATENT DOCUMENTS

| | | |
|---|---|---|
| EP | 1 154 576 | 11/2001 |
| GB | 2 324 444 | 10/1998 |
| WO | WO 03/043218 | 5/2003 |

OTHER PUBLICATIONS

International Search Report, dated Feb. 17, 2009, issued in International Application No. PCT/GB2008/050628.
International Preliminary Report on Patentability, dated Oct. 9, 2009, issued in International Application No. PCT/GB2008/050628.
UK Search Report, dated Jan. 30, 2008, issued in priority GB Application No. GB0719318.8.

* cited by examiner

*Primary Examiner* — Esaw Abraham
(74) *Attorney, Agent, or Firm* — Saul Ewing LLP

(57) ABSTRACT

A method of transmitting a data sequence between a sender and a receiver over a wireless link. The method comprises, at the sender, segmenting the data sequence into a plurality of data segments and, for each segment, constructing a frame containing as payload the data segment, transmitting the frame across the wireless link, and receiving an acknowledgement or non-acknowledgement from said receiver for the frame, and only upon receipt of such acknowledgement or non-acknowledgement, retransmitting the frame or transmitting a further frame containing as payload the next data segment.

4 Claims, 6 Drawing Sheets

WIRELESS TRANSMISSION METHOD AND APPARATUS

CROSS REFERENCE TO RELATED APPLICATIONS

This application claims the priority of PCT/GB2008/050628, filed on Jul. 28, 2008, which claims priority to Great Britain Application No. 0719318.8, filed Oct. 4, 2007, the entire contents of which are hereby incorporated in total by reference.

FIELD OF THE INVENTION

The present invention relates to a wireless transmission method and apparatus and in particular to such a method and apparatus which breaks a data sequence into segments for transmission over the air within respective frames.

BACKGROUND TO THE INVENTION

FIG. 1 illustrates schematically a physiological data detection and monitoring system such as might be used to collect and analyse electrocardiogram (ECG) data from a patient. The system comprises a two-part ECG monitoring system comprising a first part 1, referred to here as the "digital plaster", which resembles a conventional plaster for covering a wound or other minor injury. The digital plaster 1 is provided on one side with an adhesive that allows a user to stick the plaster to his or her skin. The plaster comprises inputs 2a,2b for coupling to respective electrodes 3a,3b to receive ECG signals, signal processing means, and a transceiver for communicating over a wireless link with a second part, or "base station", 4. The electrodes are preferably integrated into the plaster 1, but may be separate from the plaster and coupled to it by suitable leads. The digital plaster is powered by a suitable battery, e.g. a 1V zinc air battery. Advances in technology may, in the future, allow the plaster to be self-powered, e.g. using some bio-electrical cell or using the body's electromagnetic fields.

The role of the base station 4 is to communicate with the plaster 1 over the wireless link for the purpose of recording and processing ECG data sent from the plaster 1, and configuring the operation of the digital plaster 1. The base station 4 should be suitable for carrying in a pocket or handbag or for wearing on a belt, although the design of the system is such that it can be left for prolonged periods outside of the range of the wireless link without significantly impacting on the required operation of the system.

FIG. 1 also illustrates a third system component 3 in the form of a central database 5. The base station 4 may periodically communicate with the central database 5, e.g. over a cellular telephone network, to transfer recorded ECG data to the database. This operation will allow physicians or other medical staff to remotely review the recorded data. Such a central database may manage many thousands of individual monitoring systems. Procedures for communicating between the central database and the individual monitoring systems will be readily apparent, as will the procedures for collecting and analysing data at the central database, and as such will not be described further here.

FIG. 2 illustrates in functional terms the "architecture" of the digital plaster 1. Three major processing blocks can be identified: a Sensor Interface and Processing block 6, an RF Transceiver 7, and a Digital Controller 8. Of these, the Sensor Interface and Processing block 6 performs analysis and classification operations on the detected ECG signal and will not be considered further here.

The RF Transceiver 7 enables bidirectional communication between the digital plaster 1 and the base station 4. Any appropriate transmission scheme can be used to transmit data including but not limited to AM, FM, FSK, UWB etc. The Digital Controller 8 performs various control, configuration and timing functions and updates the plaster operation when commands are received from the base station 4. The Digital Controller is also responsible for the framing of data sequences to be transmitted, i.e. for splitting a sequence into segments for transmission over the air interface within respective frames. As is well known, framing avoids the need for the retransmission of an entire data sequence should only a part of that sequence fail to be received (at the receiver). Correspondingly, the Digital Controller 7 is also responsible for the "unloading" of data segments from received frames and for the reassembly of these segments into data sequences.

FIG. 3 illustrates a simplified protocol architecture for the bidirectional wireless link used in the monitoring system 1,4 of FIG. 1. An "application" layer 9 sits on the top of the protocol stack and implements the functions of the Sensor Interface and Processing Block 6 as well as some of the functions of the Digital Controller 7. Beneath the application layer 9 sits a Data Link Layer (DLL) 10, which consists of the Logical Link Control (LLC) and Media Access Control (MAC) sublayers. Beneath the DLL 10 sits the physical layer 11. The physical layer implements the processing functions of the RF Transceiver 7.

An important role of the DLL 10 is to facilitate error free transmission over the air interface. The use of frames to transmit a data sequence is the cornerstone of this process. Individual frames can be error checked at a receiver using error checking codes (e.g. CRC codes) contained in the frame headers. On the receiver side, if the DLL correctly receives a frame, it will return an acknowledgement message (ACK) to the sender. If an error is detected in a frame, the DLL will return an error message or non-acknowledgement (NACK). In a typical system, the DLL will transmit frames in sequence (each frame includes a sequence number) and will not transmit the next frame in the sequence until an ACK is received for the in-flight frame. On the transmitter side, if a NACK is received for an in-flight frame, the DLL will re-transmit the in-flight frame. When a frame is sent by the DLL, a timer is started. If the timer expires before either an ACK or a NACK is received for the frame, the frame is retransmitted. This use of a timer avoids the transmitter hanging in the event that a frame has been lost or incorrectly received, and the ACK/NACK is lost in-flight.

On the receiver side, the DLL examines the sequence number within a received frame to determine whether or not that frame has already been received. A duplicate frame may be received when the ACK for a given frame has been lost in flight and, following expiry of the timer at the sender, that same frame is retransmitted. If a received frame is a duplicate, it is discarded whilst at the same time an ACK is returned to the sender. Assuming that a received frame is not a duplicate, the DLL at the receiver then performs an error check on the frame. If no errors are detected, an ACK is returned to the sender. If an error is found, a NACK is returned. It is noted that ACKs/NACKs are not retransmitted. As already indicated above, if the sender does not receive an ACK/NACK before a timeout occurs, it will retransmit the last sent frame.

A problem with the above approach is that it allows the transmission of duplicate frames, even when a frame has been correctly received at the receiver side. As the frame size can be relatively large, e.g. several Kbytes, such retransmissions are wasteful of power resources at the transmitter. Whilst this is not necessarily a problem for devices having large batteries (or mains power supplies), it is a problem for massively miniaturised devices such as the digital plaster 1 described above.

SUMMARY OF THE INVENTION

It is an object of the present invention to substantially eliminate the need for the retransmission of frames where such frames have already been correctly received at a receiver. This and other objects are achieved by causing the receiver to repeat the transmission of ACKs/NACKs until such time as an expected frame is received, and causing the sender to transmit/retransmit a frame only after it has received an ACK/NACK for the most recently sent frame.

According to a first aspect of the present invention there is provided a method of transmitting a data sequence between a sender and a receiver over a wireless link, the method comprising, at the sender, segmenting the data sequence into a plurality of data segments and, for each segment:
  a) constructing a frame containing as payload the data segment;
  b) transmitting the frame across the wireless link; and
  c) receiving an acknowledgement or non-acknowledgement from said receiver for the frame, and only upon receipt of such acknowledgement or non-acknowledgement, retransmitting the frame or transmitting a further frame containing as payload the next data segment.

The method presented here differs from prior art approaches in that a timeout at the sender is not used to trigger the retransmission of a frame. Rather, the sender will only retransmit when a NACK has been received. This avoids the unnecessary retransmission of a frame when that frame has already been correctly received by the receiver, but an ACK for that frame is lost in-flight. In this case, the sender will wait for receipt of a retransmitted NACK.

According to a second aspect of the present invention there is provided a method of transmitting a data sequence between a sender and a receiver over a wireless link, the method comprising, at the receiver:
  a) receiving a frame containing as payload a segment of a data sequence;
  b) determining whether or not the frame contains an error and sending an acknowledgement or a non-acknowledgement accordingly to the sender;
  c) starting a timer, and if the timer expires prior to receipt of a subsequent or retransmitted frame, retransmitting said acknowledgement or a non-acknowledgement; and
  d) repeating step c) at least up to a predefined number of retransmissions.

According to a third aspect of the present invention there is provided apparatus for transmitting a data sequence between to a receiver over a wireless link, the apparatus comprising:
  means for segmenting the data sequence into a plurality of data segments;
  means arranged, for each segment, to
    construct a frame containing as payload the data segment;
    to transmit the frame across the wireless link; and
    to receive an acknowledgement or non-acknowledgement from said receiver for the frame, and only upon receipt of such acknowledgement or non-acknowledgement, to retransmit the frame or transmit a further frame containing as payload the next data segment.

According to a fourth aspect of the present invention there is provided apparatus for receiving a data sequence transmitted by a sender over a wireless link, the apparatus comprising:
  means for receiving a frame containing as payload a segment of a data sequence;
  means for determining whether or not the frame contains an error and for sending an acknowledgement or a non-acknowledgement accordingly to the sender;
  means for starting and monitoring a timer, and if the timer expires prior to receipt of a subsequent or retransmitted frame, for retransmitting said acknowledgement or a non-acknowledgement, and for resetting the timer and repeating retransmission, at least up to a predefined number of retransmissions, in the absence of receipt of a retransmitted or further frame.

A further aspect of the invention provides for a system comprising the sender and receiver in combination.

DETAILED DESCRIPTION OF CERTAIN EMBODIMENTS OF THE INVENTION

As has already been described above, a conventional wireless link protocol architecture relies upon the framing of data segments, and the transmission and receipt of frame acknowledgements (ACK) and non-acknowledgements (NACK), to ensure the error free transmission of a data sequence between a sender and a receiver. A modified and improved protocol architecture will now be described. Typically, this architecture involves modifying the dynamic link layer (DLL) protocol. Other protocol layers may be conventional in their functionality, although there is of course nothing to prevent modifications being made to other layers, e.g. to construct and end-to-end proprietary protocol stack.

Underlying the architecture described here is a recognition a frame is only re-transmitted when a NACK is explicitly received at the sender. A receiver will retransmit a NACK repeatedly until such time as it receives the requested retransmit frame. A NACK frame is significantly smaller than a data frame, and so the requirement to retransmit NACKs is greatly outweighed by the benefit obtained in not having to unnecessarily retransmit a data frame (following for example the loss of an ACK on the link).

Establishment of a wireless link between two devices initially requires the performing of a "handshaking" operation between the parties. The initiator ensures it has successfully started the communication (i.e. the listening device has received the initiator's request). After this operation, the "sender" and "receiver" in the ensuing transaction have been determined. The sender is the source of the payload, while the receiver is the recipient of the payload.

Once the sender and receiver have been established, the sender segments a data sequence received (from the application layer) and commences the sending of data frames. After a data frame has been sent, the sender waits for a response from the receiver, either confirming that the data was correctly received (ACK) or that it was incorrectly received (NACK). If a NACK is received, the sender re-transmits the last sent frame, otherwise, if it receives an ACK, it sends the next frame (if any payload data remains).

The sender does not send another frame (either a re-transmit or the next frame) until it has correctly received a response from the RECEIVER. In order to prevent the link from hanging, the receiver will repeat the sending of a response (ACK/NACK) at regular intervals until it gets a new data frame. A higher level protocol timeout (implemented within the application layer) initiates a timer upon sending of a first ACK/NACK, whereupon expiry of the timer prior to receipt of a data frame terminates the communication on receiver side. Similarly, on the sender side, a higher level protocol timeout initiates a timer upon sending of a data frame, whereupon expiry of the timer prior to receipt of an ACK/NACK terminates the communication on the sender side.

Figure 4:
FIG. 4 illustrates signaling exchanged between a sender and a receiver according to a frame based protocol.
Figure 4:
Figure 4:
Figure 4:
Figure 4:
Figure 4:
Figure 4:
Figure 4:

FIG. 4 illustrates four (A to D) signaling scenarios according to this procedure. These are:
  A. The sender transmits a frame (N in a sequence) which is correctly received by the receiver. The receiver returns an ACK which is also correctly received by the sender, causing the sender to transmit the next frame in the sequence (N+1).
  B. The sender transmits a frame (N) which is incorrectly received by the receiver. The receiver returns a NACK which is correctly received by the sender, causing the sender to retransmit the previously sent frame (N).
  C. The sender transmits a frame (N) which is correctly received by the receiver. The receiver returns an ACK which is lost in-flight. Failure to receive a data frame causes the receiver to repeat the sending of the ACK. The third ACK is received by the sender, causing the sender to transmit the next frame in the sequence (N+1).
  D. The sender transmits a frame (N) which is incorrectly received by the receiver. The receiver returns a NACK which is lost in-flight. Failure to receive a data frame causes the receiver to repeat the sending of the NACK. The third NACK is received by the sender, causing the sender to retransmit the last sent frame (N).

Figure 5:
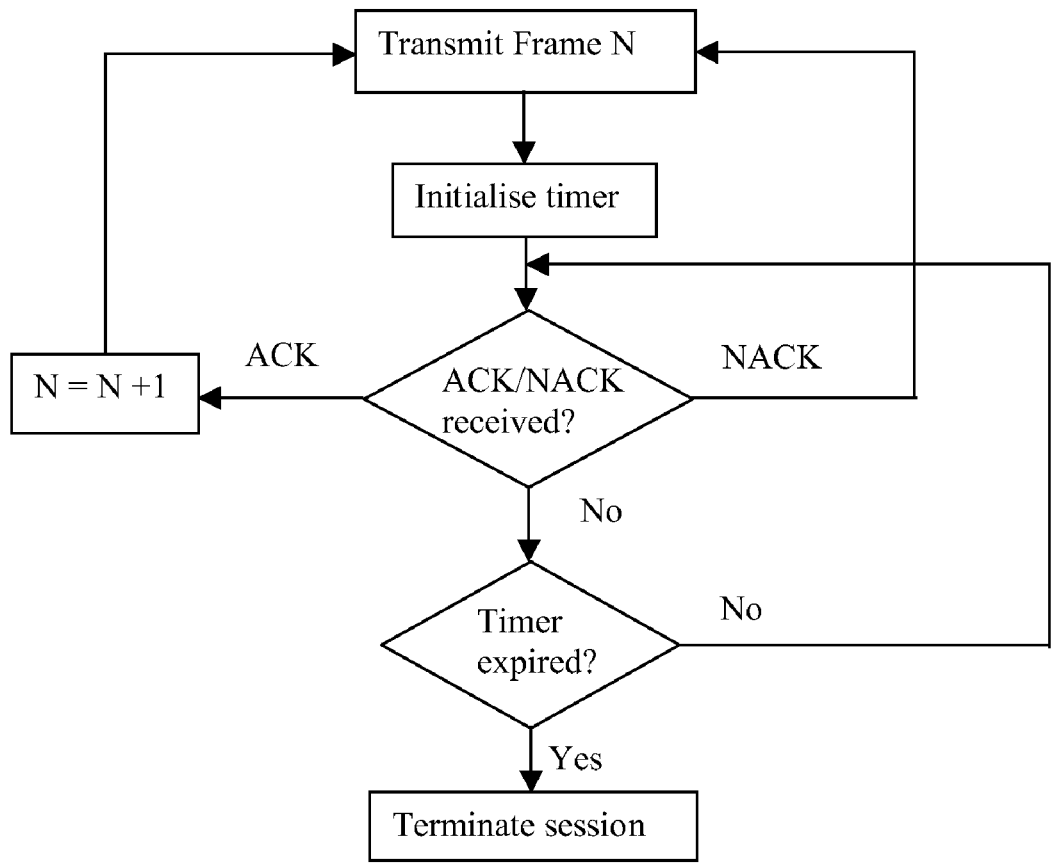
FIG. 5 is a flow diagram illustrating a process carried out at a sender.
Figure 6:
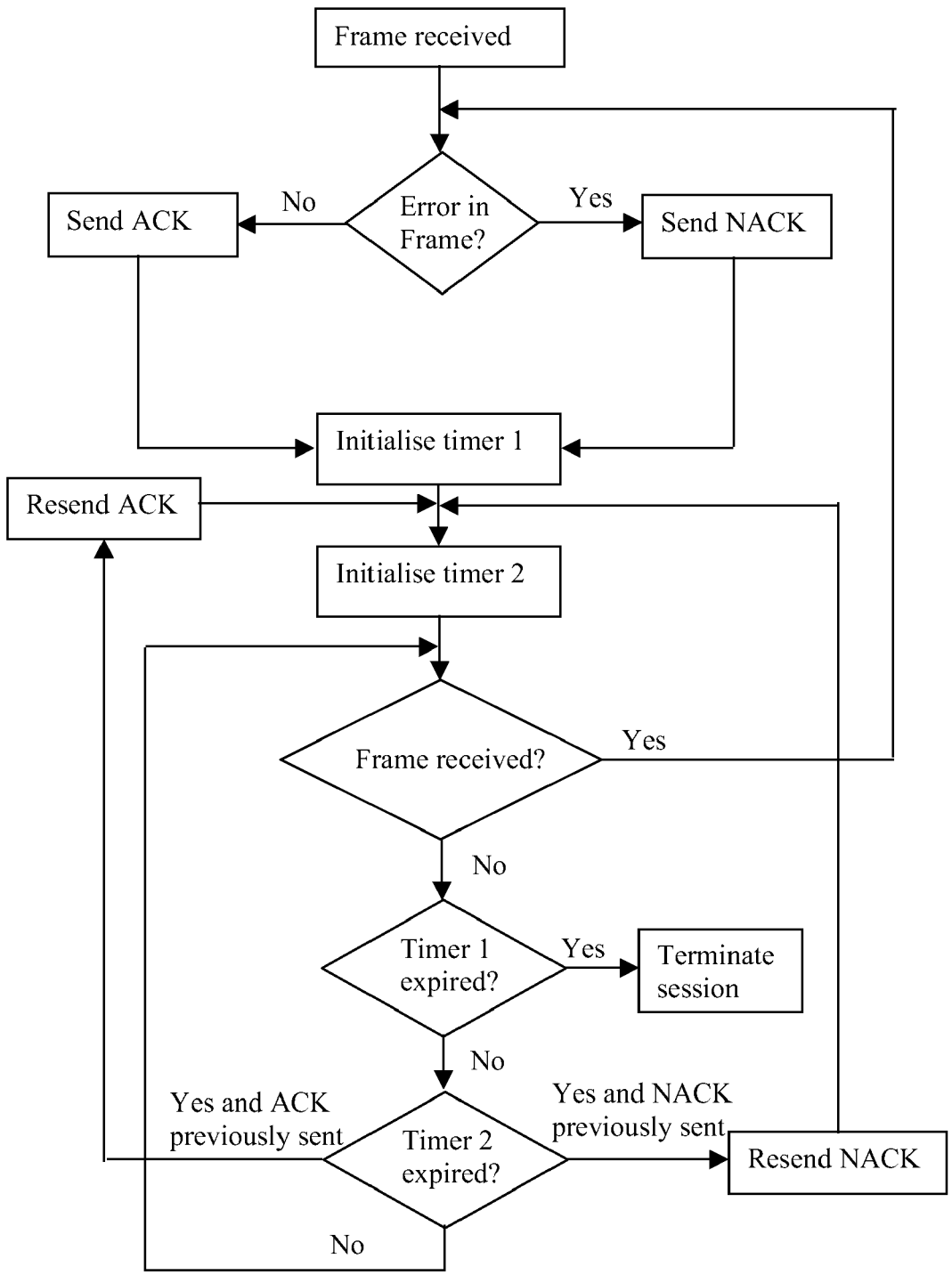
FIG. 6 is a flow diagram illustrating a process carried out at a receiver.

The processes carried out at the sender and receiver are illustrated further in the flow diagrams of FIGS. 5 and 6 respectively.

Figure 1:
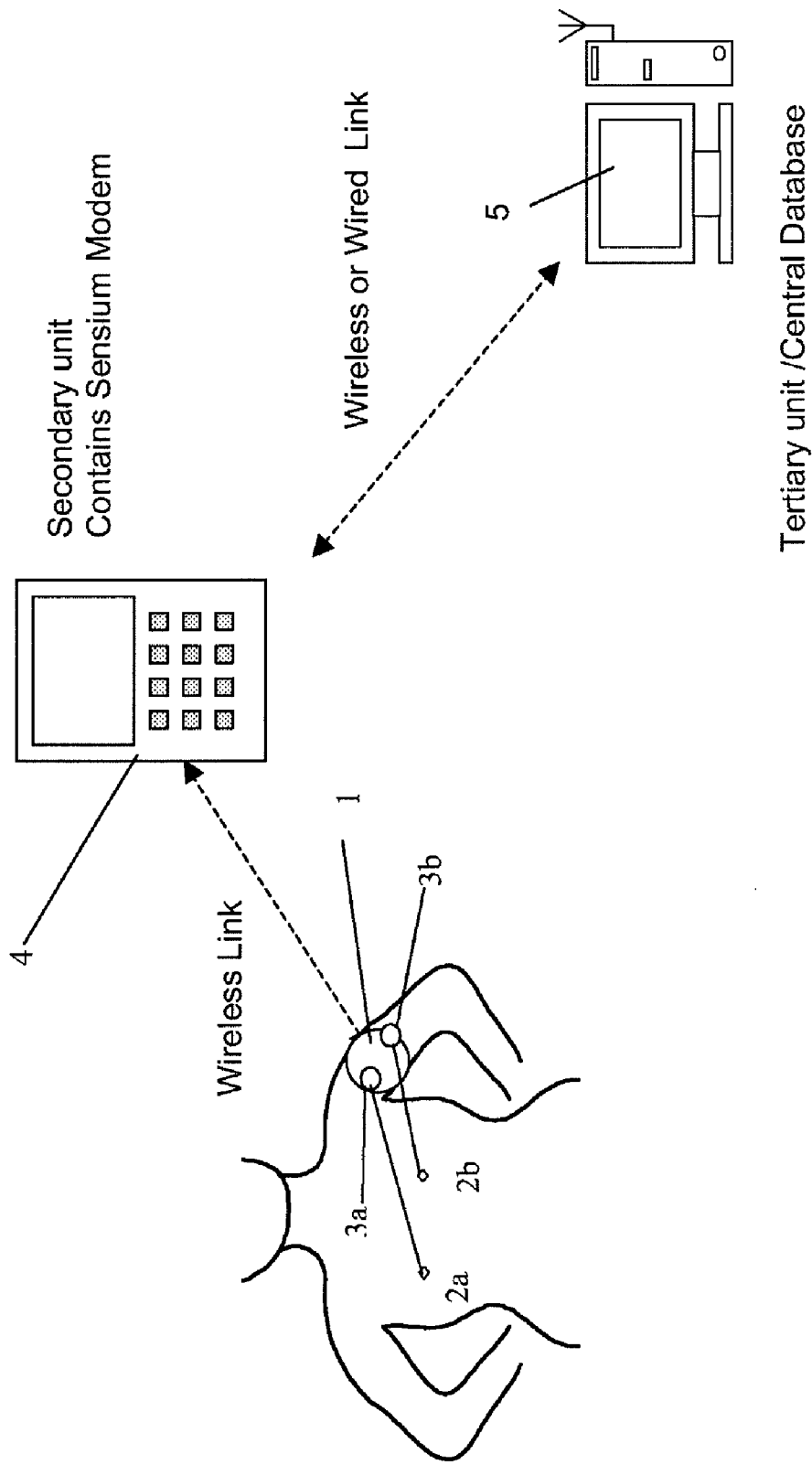
FIG. 1 illustrates schematically a physiological data monitoring system.
Figure 2:
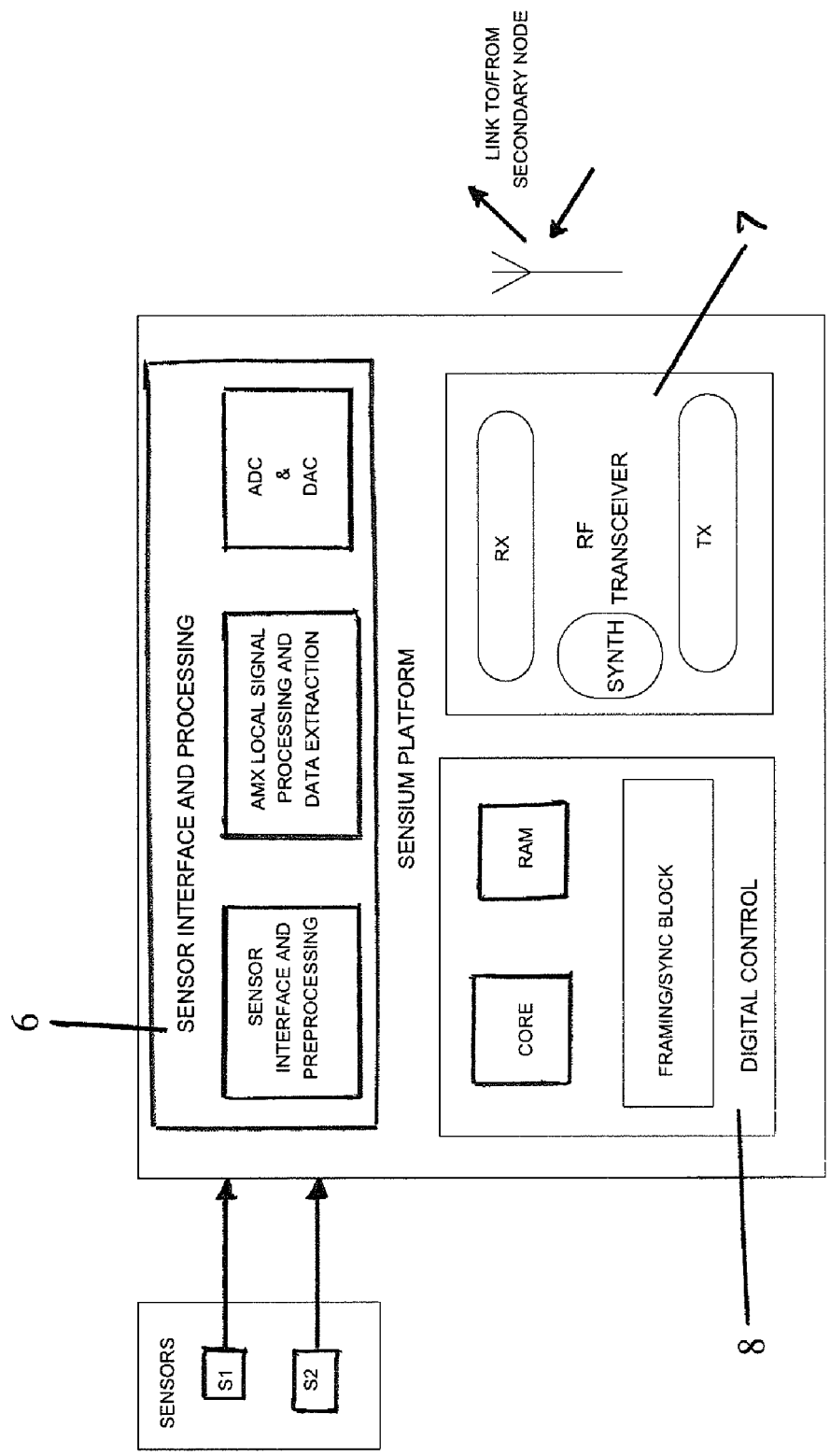
FIG. 2 illustrates the functional architecture of a digital plaster of the system of FIG. 1.
Figure 3:
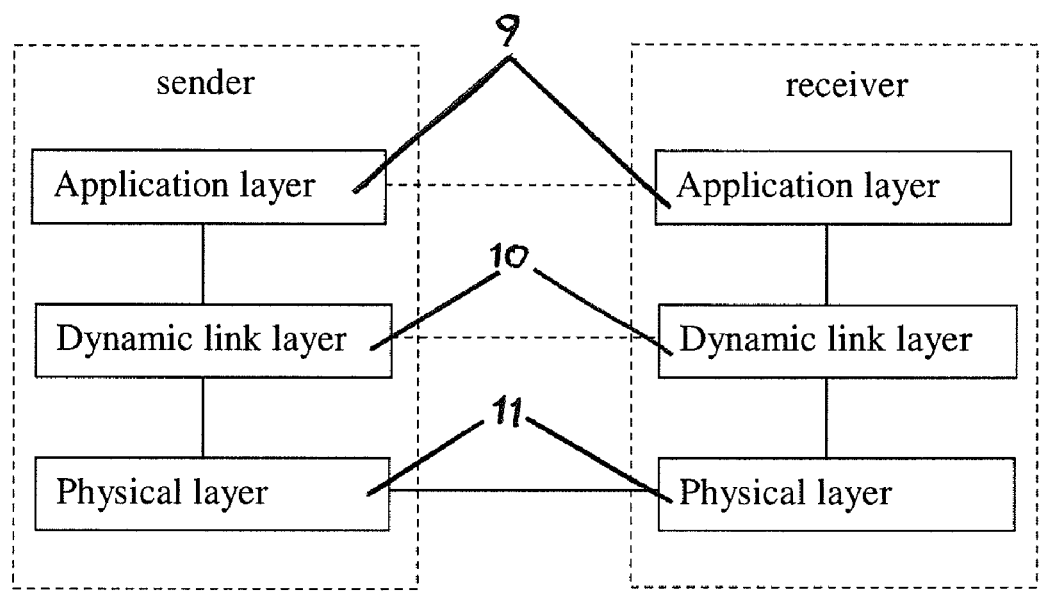
FIG. 3 shows a protocol architecture for a bidirectional wireless link between a digital plaster and a base station of the system of FIG. 1.

The mechanism described above may be embodied in the system illustrated in FIGS. 1 and 2 to enable error free and efficient communication between the digital plaster 1 and the base station 4. The Digital Controller 8 within the digital plaster, and a corresponding controller within the base station, may be configured to implement the acknowledgement and retransmission procedures.

It will be appreciated by the person of skill in the art that various modifications may be made to the above described embodiment without departing from the scope of the present invention.

The invention claimed is:

1. A method of transmitting a data sequence between a sender and a receiver over a wireless link, the data sequence being segmented into a plurality of data segments, the method comprising, for each data segment:
  at the sender:
    a) constructing a frame containing as payload the data segment; and
    b) transmitting the frame across the wireless link;
  at the receiver:
    c) receiving the frame,
    d) determining whether or not the frame contains an error, and sending an acknowledgement or non-acknowledgement accordingly to the sender,
    e) starting a timer, and if the timer expires prior to receipt of a subsequent or retransmitted frame, retransmitting said acknowledgement or non-acknowledgement,
    f) repeating set e) at least up to a predefined number of transmissions; and
  at the sender:
    g) receiving an acknowledgement or non-acknowledgement from said receiver for the frame, and only upon receipt of such acknowledgement or non-acknowledgement, retransmitting the frame or transmitting a further frame containing as payload the next data segment.

2. The method according to claim 1, wherein steps a) and b) are handled within a data link layer implemented at the sender.

3. The method according to claim 1, wherein steps d) and e) are handled within a data link layer implemented at the receiver.

4. A system for transmitting a data sequence over a wireless link, the data sequence being segmented into plurality of data segments, the system comprising:
  a sender arranged to construct a frame containing as payload a data segment, and to transmit the frame across the wireless link;
  a receiver arranged to receive the frame, determine whether or not the frame contains an error, send an acknowledgement or a non-acknowledgement accordingly to the sender, start a timer, and if the timer expires prior to receipt of a subsequent or retransmitted frame, retransmit said acknowledgement or non-acknowledgement, and to reset the timer and repeat retransmission, at least up to a predefined number of retransmissions, in the absence of receipt of a retransmitted or further frame; and
  the sender being further arranged to receive an acknowledgement or non-acknowledgment from said receiver of the frame, and only upon receipt of such acknowledgment or non-acknowledgement, to retransmit the frame or transmit a further frame containing as payload the next data segment.

* * * * *